(12) United States Patent　　(10) Patent No.: US 12,653,159 B2

Swiryn　　(45) Date of Patent: Jun. 16, 2026

(54) AUTOMATIC PET SCOOPING AND SEALING SYSTEM

(71) Applicant: Scott Swiryn, Citrus Heights, CA (US)

(72) Inventor: Scott Swiryn, Citrus Heights, CA (US)

( * ) Notice: Subject to any disclaimer, the term of this patent is extended or adjusted under 35 U.S.C. 154(b) by 0 days.

(21) Appl. No.: 18/466,444

(22) Filed: Sep. 13, 2023

(65) Prior Publication Data

US 2025/0081939 A1　　Mar. 13, 2025

(51) Int. Cl.
*A01K 23/00*　　(2006.01)

(52) U.S. Cl.
CPC .................................. *A01K 23/005* (2013.01)

(58) Field of Classification Search
CPC ........ A01K 23/005; A01K 23/00; A01K 1/01; E01H 1/1206; E01H 2001/1293
See application file for complete search history.

(56) References Cited

U.S. PATENT DOCUMENTS

| | | | | |
|---|---|---|---|---|
| 3,446,525 | A | | 5/1969 | Jones |
| 3,786,780 | A | | 1/1974 | Pezzino |
| 4,010,970 | A | * | 3/1977 | Campbell ............ A01K 23/005 |
| | | | | 294/1.5 |
| 4,273,370 | A | * | 6/1981 | Kjaer .................... E01H 1/1206 |
| | | | | 294/1.3 |
| 4,741,566 | A | * | 5/1988 | Byung-Do ........... A01K 23/005 |
| | | | | 15/257.3 |
| 5,503,442 | A | * | 4/1996 | Lee ....................... E01H 1/1206 |
| | | | | 294/1.4 |
| 6,086,123 | A | | 7/2000 | Sowinski |

| | | | | |
|---|---|---|---|---|
| 6,186,663 | B1 | | 2/2001 | Ausnit |
| 6,854,886 | B2 | | 2/2005 | Piechocki |
| 7,448,659 | B1 | | 11/2008 | Auseklis |
| 7,854,455 | B2 | | 12/2010 | Ruscil |
| 7,992,907 | B1 | * | 8/2011 | DeJesus ................. E01H 1/1206 |
| | | | | 294/1.4 |
| 8,292,339 | B1 | | 10/2012 | Auseklis |
| 8,714,604 | B1 | * | 5/2014 | Mihalic ................. E01H 1/1206 |
| | | | | 294/1.4 |
| 10,602,721 | B2 | * | 3/2020 | Lenger ................... E01H 1/1206 |
| 10,851,506 | B1 | * | 12/2020 | Sabella ................. E01H 1/1206 |
| 11,162,235 | B1 | * | 11/2021 | Gross .................... E01H 1/1206 |
| 11,319,684 | B1 | * | 5/2022 | Gross .................... E01H 1/1206 |
| 11,739,483 | B1 | * | 8/2023 | Sabella ................. E01H 1/1206 |
| | | | | 294/1.3 |

(Continued)

FOREIGN PATENT DOCUMENTS

| | | | | | |
|---|---|---|---|---|---|
| DE | 102008028593 | B4 | * | 3/2012 | .......... E01H 1/1206 |
| KR | 20220013791 | A | * | 2/2022 | |

(Continued)

OTHER PUBLICATIONS

Machine translation of DE-102008028593-B4 (Year: 2024).*
NPL Documents cited in in U.S. Appl. No. 16/947,940.

*Primary Examiner* — Peter M Poon
*Assistant Examiner* — Hae Rie Jessica Byun

(57)　　　　　　ABSTRACT

A poop scooping system has a handle, a pole, connected to the handle at one end of the pole and a jaws device, connecting to the other and of the pole. The jaws can open and close. A bag dispenser, dispenses bags where the bags can be pulled around an outside surface of jaws. A processor controls the jaws opening and closing, when closed, heat seals the bag in two spaced locations to seal the bag with poop therein.

6 Claims, 5 Drawing Sheets

(56)                    References Cited

U.S. PATENT DOCUMENTS

| | | | |
|---|---|---|---|
| 2006/0214441 A1* | 9/2006 | Lopoukhine | E01H 1/1206 294/1.4 |
| 2008/0145268 A1 | 6/2008 | Martin | |
| 2008/0276883 A1 | 11/2008 | Perez Tomas | |
| 2009/0050065 A1* | 2/2009 | Evans | E01H 1/1206 294/1.4 |
| 2010/0096867 A1* | 4/2010 | Flinn | E01H 1/1206 294/1.4 |
| 2011/0193359 A1* | 8/2011 | Howard | E01H 1/1206 294/1.3 |
| 2012/0256430 A1* | 10/2012 | Merino-Garcia | A01K 27/004 294/1.3 |
| 2014/0137811 A1 | 5/2014 | Kovarik et al. | |
| 2014/0152033 A1* | 6/2014 | Wilson | E01H 1/1206 294/1.4 |
| 2015/0042112 A1 | 2/2015 | Briski et al. | |
| 2015/0167264 A1* | 6/2015 | Naseem | E01H 1/1206 294/1.4 |
| 2015/0230811 A1 | 8/2015 | Kovarik et al. | |
| 2017/0159254 A1* | 6/2017 | Gordon | A47L 7/0061 |
| 2018/0179713 A1* | 6/2018 | Casey | E01H 1/1206 |
| 2018/0368370 A1* | 12/2018 | Lenger | A01K 23/005 |
| 2020/0157753 A1* | 5/2020 | Patterson | H05B 3/0014 |
| 2020/0359601 A1* | 11/2020 | Jimenez | A01K 23/005 |
| 2021/0032824 A1* | 2/2021 | Swiryn | E01H 1/1206 |
| 2023/0058613 A1* | 2/2023 | Burr | B65F 1/1415 |
| 2023/0279626 A1* | 9/2023 | Rodriguez | A01K 23/005 294/1.5 |
| 2024/0328102 A1* | 10/2024 | Zamir Peer | A01K 23/005 |

FOREIGN PATENT DOCUMENTS

| | | | |
|---|---|---|---|
| KR | 20230017487 A | * | 2/2023 |
| KR | 20230057166 A | * | 4/2023 |

\* cited by examiner

AUTOMATIC PET SCOOPING AND SEALING SYSTEM

BACKGROUND

Picking up dog excrement is important for many reasons, including cleanliness, reduction of smells, parasites, and bacteria. Many towns and neighborhoods have mandated that users must pick up after their dogs.

A simple way of picking up dog poop is to use a plastic bag which is turned inside out and used like a glove to scoop the poop so that the poop sits inside the bag once the bag is turned inside out.

My other U.S. Pat. No. 10,787,778-B1 and publication US20210032824-A1 describe a pet poop scooper device which can be used to manually obtain the poop from the ground, and bag the poop while keeping the outside surface of the bag clean.

SUMMARY

The inventor recognized that current systems have limitations, and specifically advantages of an electronic version of an excrement or "poop" bagger, including its ability to automate some or all of the movements and actions needed to pick up pet poop, and bag and seal the poop.

The present application describes an advancement of this using special kinds of technology to isolate the poop, put the poop in a bag, close the bag, seal the bag, and allow the operator to dispense new bags, all while maintaining cleanliness of the tool itself.

An embodiment describes a double seal system which even further makes sure that the sealed bag has poop on the inside but not on the outside.

BRIEF DESCRIPTION OF THE DRAWINGS

These and other aspects will now be described with reference to the accompanying drawings wherein.

The Drawings show aspects of the invention, and specifically.

DETAILED DESCRIPTION

Any of the embodiments described herein may be used together, or separate parts thereof can be used as separate embodiments.

The present application describes using an electronic system to scoop and bag pet poop.

Figure 1:
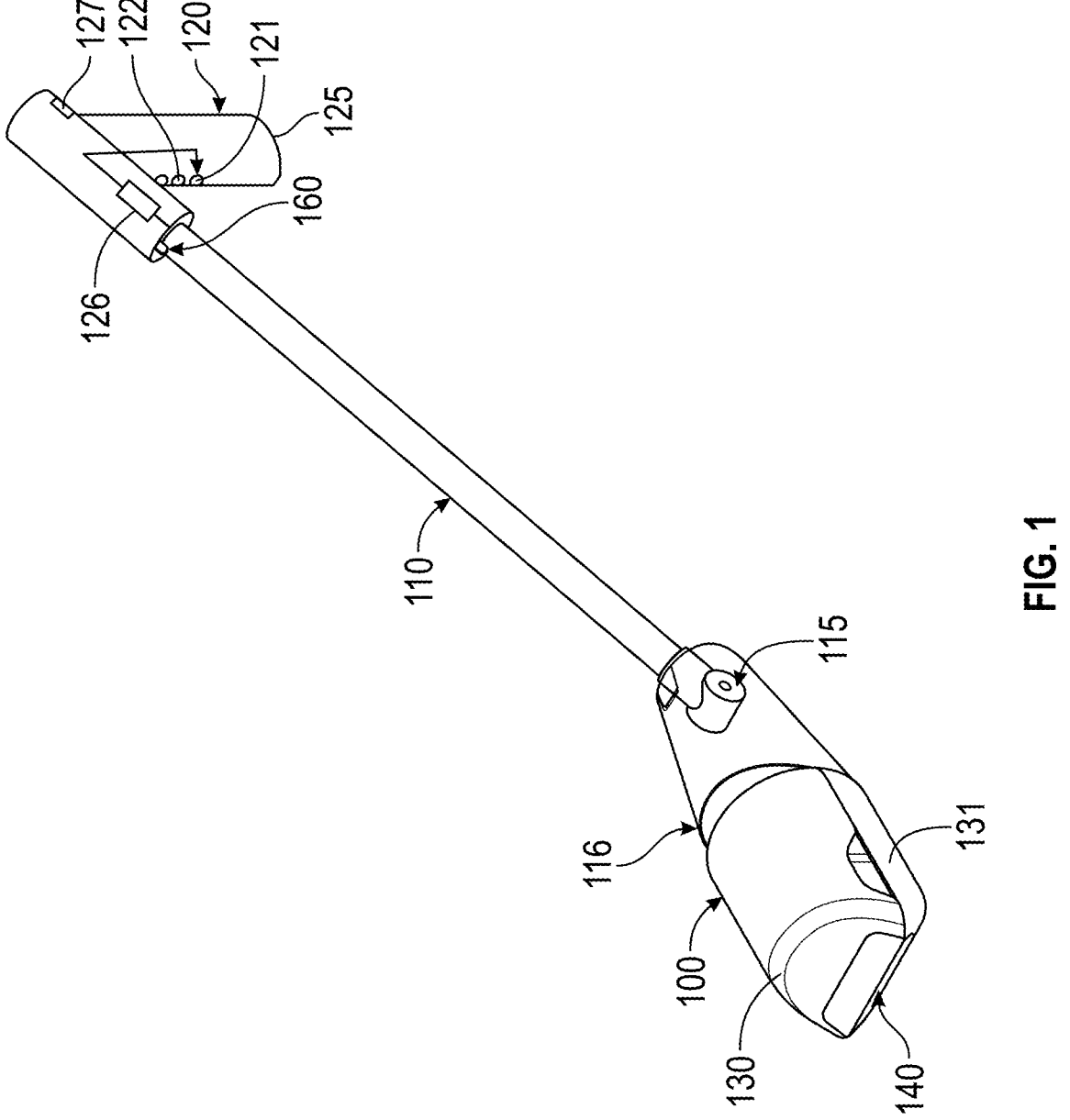
FIG. 1 shows a drawing of the poop scooper device with the jaws closed.
Figure 2:
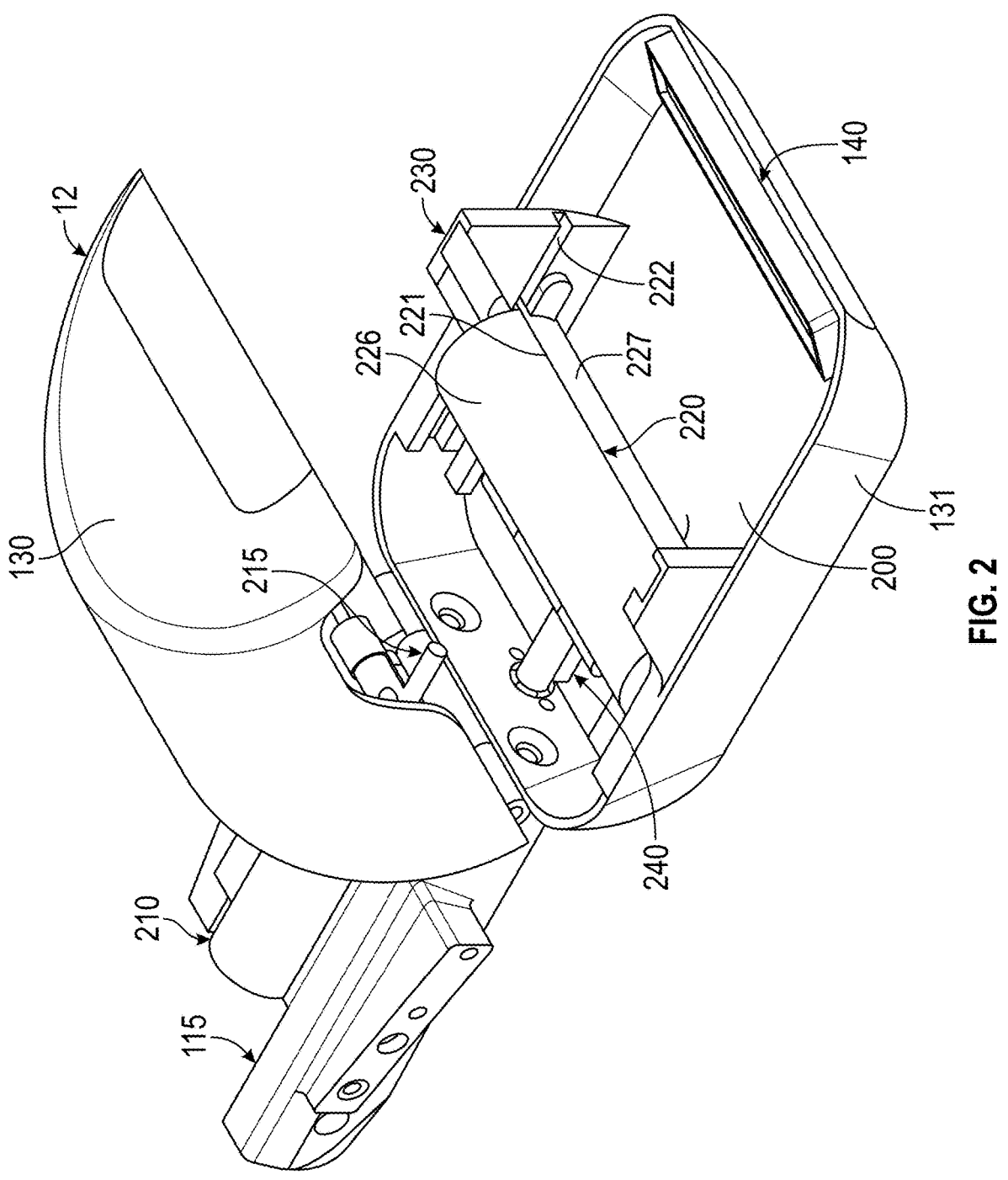
FIG. 2 shows the jaws of the poop scooper device in the open position.

The poop scooping tool is shown in FIGS. 1 and 2. An electromechanical jaw mechanism 100 is formed at one end of a telescopic handle pole 110. The telescopic handle pole 110 has parts which can be moved relative to one another in order to make the overall pole longer or shorter.

The jaw mechanism 100 is at one end of the pole 110, mounted on a pivoted connection 115 relative to the pole that allows the jaw to pivot or tilt, back and forth or up and down.

These parts allow adjustment to better adjust to the owner's height.

A handle area 120 is formed at the opposite end of the pole 110. The jaw is mounted on a swivel 101 to allow the jaw to swivel relative to the pole 110. The handle mechanism includes control buttons 121 and 122 which are used to control the device as described herein. An electronic controller 126, e.g., a microcontroller or processor, is also located in the handle, and controls the operations of the jaws as described herein.

In an embodiment, a removable and rechargeable battery pack 125 is also located on the handle, connected via an internal wired connection to power the circuits and motors to operate the jaw mechanism 100.

The Jaw mechanism includes a top jaw part 130 and a bottom jaw part 131 which move relative to one another to cause the jaw to open as shown in FIG. 2, and close as shown in FIG. 1. A motor operates to open and close the jaws. A motor shroud is shown in FIG. 1 as 116, covering the motor. The front part of the jaws includes a heat seal mechanism 140 which operates as described herein to seal the bag as needed.

FIG. 2 shows the jaws in the open position, where the bottom jaw 131 and the top jaw 130 have been opened relative to one another to expose the inner cavity 200 inside the jaws. In an embodiment, only the top jaw 130 is movable, the top jaw opening in order to expose the inside cavity 200, where the bags are located.

The motors 210 can be rotating motors which rotate a drive screw 215 which opens the top part 130 of the jaws.

A bag holder 220 holds a roll of bags therein. The bag holder 220 includes an opening 221 at the front, through which a bag, from the roll, is released. This opening 221 can be changed in size by the motor moving the bag roller forwards and backwards. The opening 221 is shown in its minimal position in FIG. 2, and in its open position in FIG. 3.

The roll of bags can be inserted and removed into the device on a bag holder track 222 formed in a wall 230. Alternatively, the roll of bags can be rolled with no track, and just being a cylindrical roll that unrolls.

In operation, the two jaw parts 130, 131 can open and close relative to one another by appropriate actuation of an electromagnetic actuator 333. When closed, the two parts form a complementary shape that forms the interior cavity 200. The portion of any bag that is inside the cavity and adjacent the heat sealer 140 can be sealed by the heat.

In operation, the jaws are driven to open by the rotation of the electric motor 210 which rotates the drive screw 215 which opens the top portion 130 of the jaws. The jaws are open fully wide.

Figure 3:
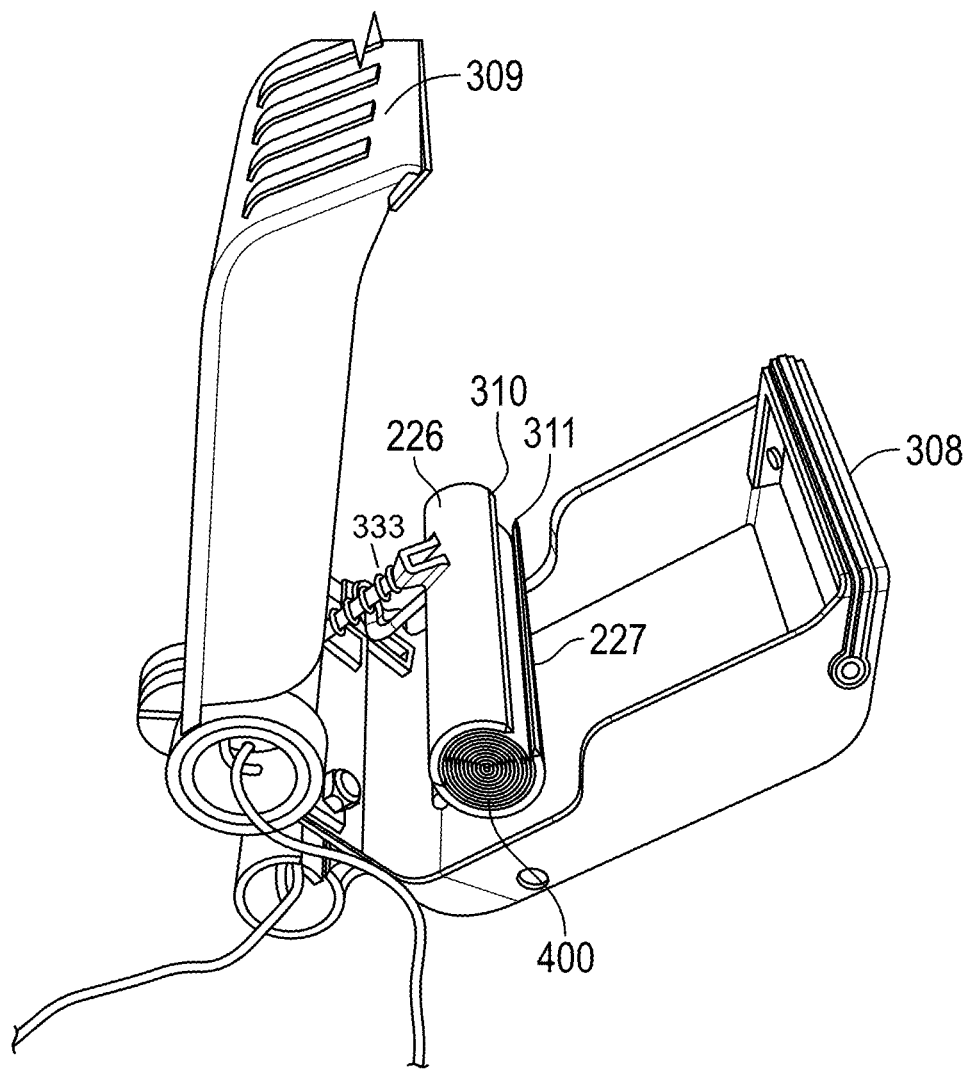
FIG. 3 shows the jaws open, and shows how the bag dispensing device is opened to allow a bag to be dispensed.

This exposes the bag dispenser 220 that is on the inside of the jaws. FIG. 3 illustrates how the bag dispenser can be pushed forward by the motor, to cause the top portion 226 of the bag dispenser to separate from the bottom portion 227 of the bag dispenser. The edge portions 310, 311 of the top and bottom portions of the bag dispenser are formed with cutting parts such as blades on their lip edges, such that when they close completely, they cut the bag in the roll at the portion when those lip portions close over the extended bag. The roll of bags 400 which is inside the bag dispenser is thus exposed in this way and a portion within the roll of bags is allowed to be removed, and then is cut when the lips are closed.

Figure 4:
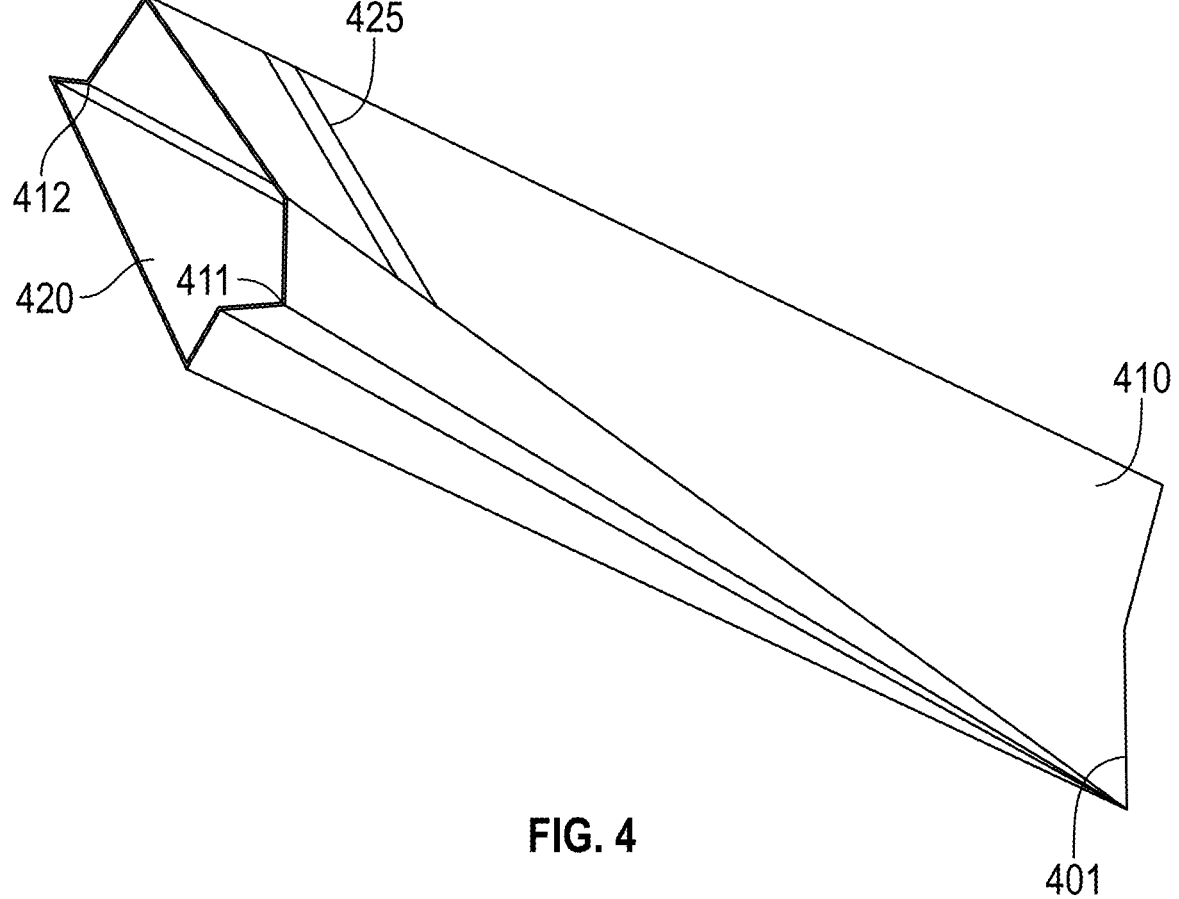
FIG. 4 shows the bag wrapped around the outside of the scooper device to prepare for the poop scooping.

A bag is unrolled from the bag dispenser, pulled out toward the jaws, and the mouth of the bag is wrapped over the lips 308, 309 of the jaws. The bag can be "gusseted" as shown in FIG. 4. FIG. 4 shows how the bags is closed at the first end 401, and has an opening 420 at the second end. the bag has gussets 411, 412, basically folds, at its two edges near the opening. The bag(s) are also imprinted with a stop line 425, which is where the heat sealing preferably occurs.

The bags are 8 inches long (to the stop line), and 23 inches in circumference. The bags are 4 inches wide, thus forming a 4 inch wide bag roll.

At this point, the jaws are lowered over the waste with the jaws open. The bag is covering the edges of the jaws and the inner cavity of the jaws is open and covered by the bag.

The jaws are then closed electrically using the actuator 333, which closes the jaws, as covered with the bag, and where the waste is inside the cavity in the bag.

After the jaws are closed, the heat seal 140 is energized, which fuses closed the mouth 420 of the bag 410 at the stop line 425.

In this way, the waste is sealed inside the bag and all of it is still inside the inner cavity.

In an embodiment, the jaws can then be opened a small amount, for example ½ to 1 inch.

At this point, the bag is electromagnetically drawn into the jaws, using the bag dispenser to which the bag is still connected. The jaws are then reclosed, and the heat seal is then reenergized to fuse the bag at a second location. This provides a double seal, and a spaced double seal of the waste material into the bag. All of this is done by the controller, as described herein.

In an embodiment, two 12 V motors are located in the jaws. A first motor is a 500 RPM motor that opens and closes the jaws. A second motor, a 400 RPM operates the bag dispenser. In an embodiment, the batteries are a rechargeable 3.7 V battery pack.

Figure 5:
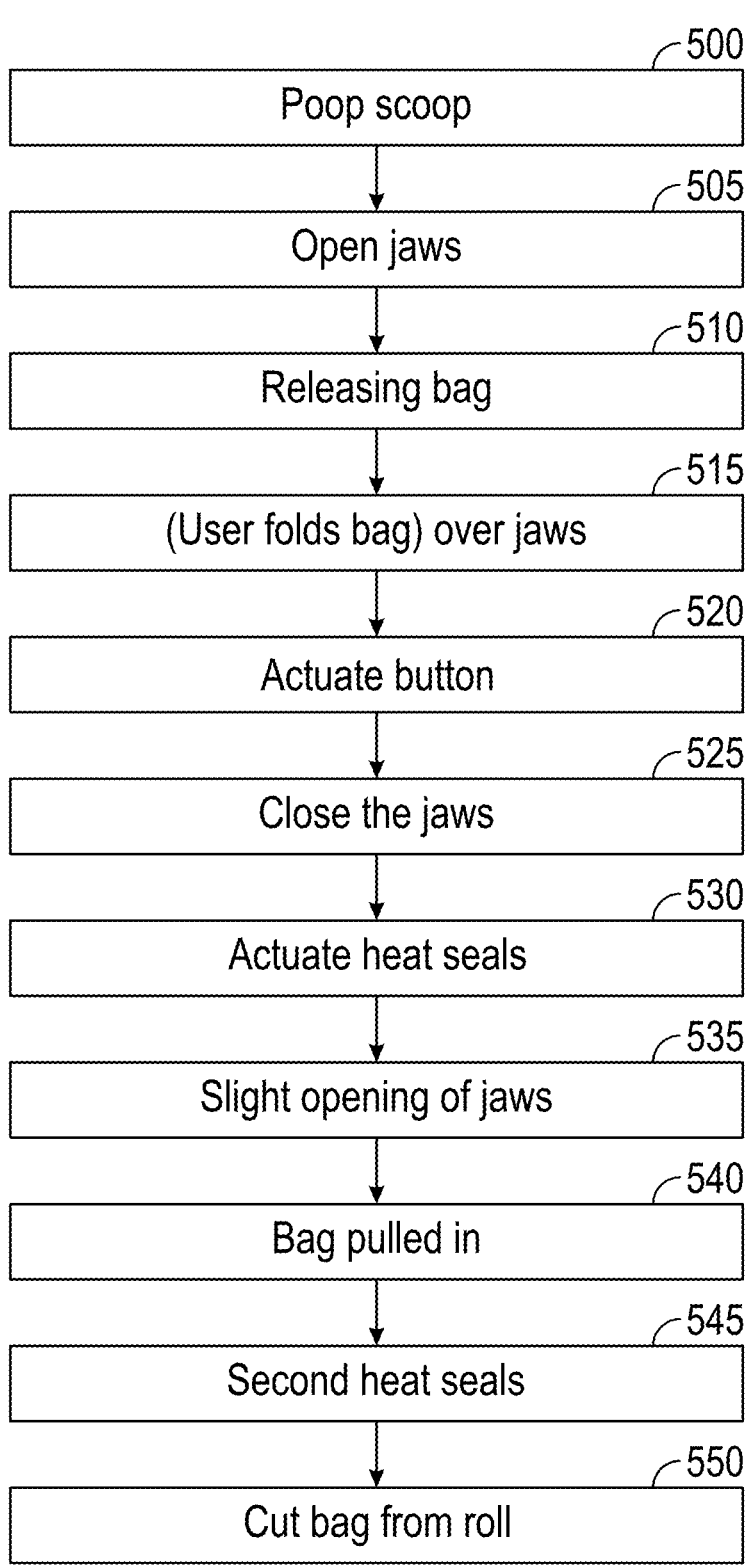
FIG. 5 shows a flowchart of operation of the processing device in an automatic mode.

The buttons on the handle can cause different sequences as described herein. Each button can cause the manual operation, where a first button can open the jaws; a second button can close the jaws, and a third button can carry out heat sealing. However in a more preferred embodiment, the controller operates according to the flowchart of FIG. 5 when a button is pressed to carry out all these operations in sequence.

The button press causes a beginning of a poop scooping operation at 500. The poop scooper operation starts by opening the jaws, and at 505 and releasing the bag by opening the bag dispenser at 510.

At this point, the user must get involved by pulling out the bag and folding it over the jaws at 515, to create the bag over jaws configuration of the bag.

Once the user has folded the bag over the jaws, the user actuates a button again at 520, to cause the poop scooping operation. At 525, the jaws are closed, to close the bag around the poop. 530 actuates the heat sealer. This causes the bag, now closed around the poop, to be sealed.

At 535, after the heat sealing has occurred there is a slight opening of the jaws followed at 540 by the bag being pulled in by a small amount for example ½ inch or less.

After the bag has been pulled in, at 545, a second heat sealing operation is carried out. This concludes the operation and now the user has two double heat sealed poop bag. The bag dispenser is then fully closed at 550, to cut the bag from the roll.

In different embodiments, timers and sensors can be used to improve the operation. In an embodiment, there is a sensor 240 on the jaws, that limits the closing of the jaws by sensing the closed position of the jaws. This prevents the motor from over closing the jaws, by sensing when the jaws are sufficiently shut.

In another embodiment, no sensors are used, and all timing, delays, amount of bag dispenser opening and jaws openness/closedness, amount of time to heat seal is coded in the software for the microcontroller.

Another embodiment limits the amount of time of the heat seal. Once the heat seal is started, the heat seal is an electromagnetic mechanically timed to seal the sealable bag. This can be timed differently for different bags, but typically causes the sealing of about 1 second.

In an embodiment, there are LED lights 160 at the front of the handle. This can also be equipped with a dog leash just below the handle.

In an embodiment, there is a USB port 127 in the handle to enable recharging the battery.

An embodiment, the connecting pole telescopes between 1 foot and 3 feet, with the wires inside In an embodiment, there can be four buttons on the handle, which control the operations in the sequencing. Pressing Button C allows loading of the bags. This allows jaws and bag dispenser to fully open for the purpose of loading the roll of bags into the bag dispenser. There is a 10-15 second delay to allow the loading. After that 10-15 second delay, the bag dispenser and jaws fully close.

The user then presses Button A which allows positioning of the bag around the jaws and in the cavity to the position shown in FIG. 4. The bag dispenser opens up a little, preferably just enough to allow the bag to be pulled through and around the jaws. This is now in the ready position for scooping the poop. The bag dispenser is fully closed.

The bag is placed over the poop, and the user presses Button B when jaws are over the poop. This causes jaws to close the the process of the heat sealing 2X. Jaws are then fully closed, bag dispenser is fully closed.

Press Button C—Blades cut the perforated connection of the bags, bag dispenser stays fully shut, jaws open all the way to allow the full poop bag to drop out.

Jaws are then ready to have the next bag positioned around the jaws for the next application.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A pet excrement scooping device, comprising:

a handle;

a pole, connected to the handle at one end of the pole;

a jaws device, connecting to the other end of the pole;

the jaws device having first and second jaws, which are movable between an open position where front portions of the first and second jaws open to expose an internal cavity inside the first and second jaws, and are closable to close the internal cavity, a bag dispenser, inside the internal cavity, the bag dispenser holding bags which are held in the bag dispenser and released from the bag dispenser, and the bag dispenser located in a position where the bags can be pulled around an outside surface of the first and second jaws, the bag dispenser having an opening, the opening between a first portion of the bag dispenser and a second portion of the bag dispenser, and where the first portion of the bag dispenser and the second portion of the bag dispenser which are movable relative to one another, where edge portions of the top portion and the bottom portion of the bag dispenser are formed with cutting parts on their edges, such that when the top portion and bottom portion close completely, the cutting parts on the edges cut the bag at a location where the edges close over the extended bag, a controllable bag dispenser motor, moving the bag dispenser forward and backward inside the internal cavity;

where the opening in the bag dispenser is changed in size by the controllable bag dispenser motor moving the bag roller forwards toward the front portion of the first and second jaws, and backwards away from the front portion of the first and second jaws, and the moving changes the bag dispenser between a closed position where the opening is closed and an open position in which the first portion separates from the second portion, and exposes bags inside the bag dispenser, and a processor, which controls the jaws device to open in order to obtain a bag, and controls the bag dispenser to open to obtain a bag, where the bag is placed over an outer surface of the jaws while open, so that the bag is covering the edges of the jaws and the inner cavity of the jaws is open and covered by the bag;

the processor then controlling the jaws to close in order to scoop poop into the bag which closes the jaws, as covered with the bag, and where the poop is inside the cavity in the bag, and then controlling the bag dispenser to fully close to cut the bag;

further comprising a heat sealing device, inside the jaws, which seals the bag shut after the jaws have been closed; and wherein the processor controls an automatic bag sealing operation which seals the bag in two different spaced locations, the operation including closing the jaws, sealing the bag in a first location using the heat sealing device, slightly opening the jaws and pulling the bag to a second location relative to the jaws, by moving the bag dispenser to which the bag is still connected to pull the bag into the jaws and set the second location of the bag to be sealed by the heat sealing device and then re-closing the jaws and sealing the bag in the second location spaced from the first location.

2. The device as in claim 1, wherein the processor automatically controls the jaws to open and close and controls the bag dispenser to cut and release the bag.

3. The device as in claim 1 wherein the bags comprise a roll of bags.

4. The device as in claim 1, wherein the bags are imprinted with a line which is a line for preferable heat sealing of the bags.

5. A pet excrement scooping device, comprising:

a handle;

a pole, connected to the handle at one end of the pole;

a jaws device, connecting to the other end of the pole;

the jaws device having first and second jaws, which are movable between an open position to expose an internal cavity inside the first and second jaws, and are closable to close the internal cavity, a bag dispenser area, inside the internal cavity, the bag dispenser area having a bag dispenser holding bags which are held in the bag dispenser and released from the bag dispenser, and the bag dispenser located in a position where the bags can be pulled around an outside surface of the first and second jaws, where edge portions of the bag dispenser are formed with cutting parts on their edges, and are closed to cut the bag at a location where the edges close over an extended bag, and a processor, which controls the jaws device to open in order to obtain a bag, and controls the bag dispenser to obtain a bag, where the bag is placed over an outer surface of the jaws while open, so that the bag is covering the edges of the jaws and the inner cavity of the jaws is open and covered by the bag; and the processor then controlling the jaws to close in order to scoop poop into the bag which closes the jaws, as covered with the bag, and where the poop is inside the cavity in the bag, and then controlling the edges to fully close to cut the bag;

a heat sealing device, inside the jaws, which seals the bag shut after the jaws have been closed;

and wherein the processor controls heat sealing the bag twice in two different locations using the heat sealing device, by closing the jaws, sealing the bag at a first location using the heat sealing device, then slightly opening the jaws and pulling the bag to a second location relative to the jaws, by moving the bag dispenser to which the bag is still connected to draw the bag into the jaws to put a second location of the bag at the heat sealing device, and then re-closing the jaws and using the heat sealing device for sealing the bag in the second location different than the first location.

6. The device as in claim 2, further comprising a plurality of operating controls, one of which controls an automatic operation, and where the automatic operation causes a sequence to:

1) Open the jaws, then 2) after the bag has been placed over the jaws, to close the jaws, then 3) to heat seal the bag.

\* \* \* \* \*